(12) United States Patent
Seydoux et al.

(10) Patent No.: US 9,886,033 B2
(45) Date of Patent: Feb. 6, 2018

(54) SYSTEM FOR PILOTING A DRONE IN IMMERSION

(71) Applicant: PARROT DRONES, Paris (FR)

(72) Inventors: Henri Seydoux, Paris (FR); Nicolas Brulez, Pomponne (FR); Arsene Ferrand, Paris (FR)

(73) Assignee: Parrot Drones, Paris (FR)

( * ) Notice: Subject to any disclaimer, the term of this patent is extended or adjusted under 35 U.S.C. 154(b) by 10 days.

(21) Appl. No.: 15/133,065

(22) Filed: Apr. 19, 2016

(65) Prior Publication Data

US 2016/0313732 A1   Oct. 27, 2016

(30) Foreign Application Priority Data

Apr. 23, 2015 (FR) ...................................... 15 53656

(51) Int. Cl.
*G05D 1/00* (2006.01)
*G02B 27/01* (2006.01)
(Continued)

(52) U.S. Cl.
CPC ....... *G05D 1/0033* (2013.01); *G02B 27/0172* (2013.01); *G05D 1/0016* (2013.01);
(Continued)

(58) Field of Classification Search
CPC ........ B64C 2201/027; B64C 2201/108; B64C 39/024; B64C 2201/08; B64C 2201/127; B64C 2201/141; G05D 1/0661; G05D 1/0669; G05D 1/102; B60Q 1/1423; B60Q 1/143; B60Q 2300/054; B60R 16/0236; B60R 16/03; B60R 1/00; B60R 1/062; B60R 1/12; B60R 2001/1215;
(Continued)

(56) References Cited

U.S. PATENT DOCUMENTS

2008/0033604 A1* 2/2008 Margolin ............. G05D 1/0044
  701/2
2012/0042818 A1* 2/2012 Ciausu ................... B63B 27/18
  114/44
(Continued)

FOREIGN PATENT DOCUMENTS

| EP | 2131443 A1 | 12/2009 |
| EP | 2557468 A2 | 2/2013 |
| WO | 9905580 A2 | 2/1999 |

*Primary Examiner* — Anne M Antonucci
*Assistant Examiner* — Sanjeev Malhotra
(74) *Attorney, Agent, or Firm* — Haverstock & Owens LLP

(57) ABSTRACT

The system comprises a drone and a ground station. The ground station includes a console provided with a directional antenna adapted to be directed towards the drone maintain the quality of the wireless link with the latter, and virtual reality glasses rendering images taken by a camera of the drone. The system comprises means for determining the position of the drone with respect to a heading of the console, and means for including in the images (I) rendered in the virtual reality glasses a visual indication (C, Ce, G, Id) of misalignment of the drone with respect to the console heading. Although he is isolated from the external real environment, the pilot is able, based on this visual indication, to reorient the console, typically by turning on himself, so that the directional antenna thereof suitably points towards the drone.

11 Claims, 3 Drawing Sheets

(51) Int. Cl.
*G06T 19/00* (2011.01)
*G09G 5/12* (2006.01)
*H04L 29/08* (2006.01)

(52) U.S. Cl.
CPC ......... *G05D 1/0038* (2013.01); *G05D 1/0044* (2013.01); *G06T 19/006* (2013.01); *G09G 5/12* (2013.01); *H04L 67/12* (2013.01); *G09G 2370/16* (2013.01); *G09G 2380/12* (2013.01)

(58) Field of Classification Search
CPC ........ B60R 2300/105; B60R 2300/307; B60R 2300/8093; B60W 2550/14; B60W 2550/148; B60W 30/16; B60W 40/06; G02B 2027/014; G02B 2027/0178; G02B 27/0093; G02B 27/017; G06F 1/163; G06F 3/013; G06K 9/00362; G06K 9/00791; H04N 5/2256; H04N 5/23241; H04N 7/18

USPC ................. 701/2, 3, 8, 19; 702/141; 114/44; 348/14.08, 148; 244/125, 165; 345/633; 482/37; 340/576; 1/1

See application file for complete search history.

(56) References Cited

U.S. PATENT DOCUMENTS

| | | | |
|---|---|---|---|
| 2012/0263940 A1* | 10/2012 | Arzberger | C09K 5/14 428/328 |
| 2013/0127980 A1* | 5/2013 | Haddick | G06F 3/013 348/14.08 |
| 2013/0206915 A1* | 8/2013 | Desaulniers | B64C 39/024 244/165 |
| 2013/0229523 A1* | 9/2013 | Higgins-Luthman | B60Q 1/1423 348/148 |
| 2013/0238277 A1* | 9/2013 | Sasakura | G01C 19/5776 702/141 |
| 2013/0261856 A1* | 10/2013 | Sharma | B61L 25/025 701/19 |
| 2013/0278631 A1* | 10/2013 | Border | G02B 27/017 345/633 |
| 2014/0124625 A1* | 5/2014 | Brutoco | B64B 1/12 244/125 |
| 2015/0346722 A1* | 12/2015 | Herz | G05D 1/0038 701/2 |
| 2016/0030824 A1* | 2/2016 | Jones | A63B 69/0048 482/37 |
| 2016/0078770 A1* | 3/2016 | Coulmeau | G08G 5/0039 701/3 |
| 2016/0090097 A1* | 3/2016 | Grube | B60W 40/08 340/576 |
| 2016/0179096 A1* | 6/2016 | Bradlow | B64C 19/00 701/8 |
| 2016/0244187 A1* | 8/2016 | Byers | B64C 39/024 |
| 2017/0072880 A1* | 3/2017 | Higgins-Luthman | B60Q 1/1423 |

* cited by examiner

SYSTEM FOR PILOTING A DRONE IN IMMERSION

The invention relates to rotary-wing drones such as quadricopters or the like.

Such drones are provided with multiple rotors driven by respective motors, which can be controlled in a differentiated manner so as to pilot the drone in attitude and speed.

The AR.Drone 2.0 or the Bebop Drone of Parrot S A, Paris, France are typical examples of such quadricopters. They are equipped with a series of sensors (accelerometers, 3-axe gyrometers, altimeter), a front camera capturing an image of the scene towards which the drone is directed, and a vertical-view camera capturing an image of the overflown ground.

The WO 2010/061099 A2 and EP 2 364 757 A1 (Parrot S A) describe such a drone as well as the principle of piloting it through a touch-screen multi-media telephone or media player having an integrated accelerometer, for example a cellular phone of the iPhone type or a multimedia tablet of the iPad type (registered trademarks of Apple Inc. USA). These devices incorporate the various control elements required for the detection of the piloting commands and the bidirectional exchange of data with the drone via a wireless link of the Wi-Fi (IEEE 802.11) or Bluetooth (registered trademark) local network type. They are further provided with a touch screen displaying the image captured by the front camera of the drone, with, in superimposition, a certain number of symbols for the activation of commands by simple contact of the user's finger on this touch screen.

The front video camera of the drone can be used in particular for a piloting in "immersive mode" or FPV (First-Person View) mode, i.e. where the user uses the image of the camera in the same way as if he was himself on board the drone. It may also serve to capture sequences of images of a scene towards which the drone is directed. The user can hence use the drone in the same way as a camera or a camcorder that, instead of being held in hand, would be borne by the drone. The collected images can be recorded, broadcast, put online on video-hosting web sites, sent to other Internet users, shared on social networks, etc.

In the Bebop Drone system marketed by the applicant, the user visualizes directly the image taken by the drone on a ground station marketed under the name Skycontroller, and can control the angle of view of the camera by means of the touch interface of the tablet of the iPad type with which the ground station is equipped. This view angle command acts on a digital framing and distortion correction processing applied to the image taken by the camera, of the fisheye type, so as to simulate a physical movement of the axis of the camera towards the left, the right, the top and the bottom. Moreover, the ground station has a video output for the connexion of FPV glasses for a piloting in immersive mode.

This immersive mode gives incomparable feeling to the pilot, who can orient the image rendered in the glasses to the left and to the right, and to the top and to the bottom, with respect to the heading of the drone. But, in the same time, it makes him loose the visual contact with the reality that surrounds him on the ground. Now, a drone of the above-mentioned type requires, in order to maintain the quality of the wireless link between the ground station and the drone, to maintain the antenna of the ground station oriented at least approximatively towards the drone, which is impossible to make in such an immersive mode.

The present invention aims, in a system including a drone, a ground piloting station and FPV glasses, to allow the pilot to make sure that the ground station is oriented in a direction that preserves or optimises the wireless link between the ground station and the drone.

The WO 99/05580 A2 describes a device for the remote piloting of a drone, in which an operator wears a headset provided with an eyeshade having a display screen rendering images transmitted from the drone, as well as piloting-aid visual indications.

The EP 2 131 443 A1 describes a device for the remote piloting of a drone by means of a multi-antenna arrangement, mounted for example on a control vehicle. A display screen indicates to an operator which one of the antennas is active, with the level of the received signal, so as to possibly allow a new selection, manual or automatic, of a better-oriented antenna, based on a computation of the direction and the distance of the drone with respect to the ground.

But, none of these two above-mentioned documents suggests visual means for helping a user isolated from the external real environment, who holds in hands a piloting console, to maintain the antenna of this console oriented at least approximately towards the drone to maintain the quality of the wireless link with this latter, in particular to indicate to him in which direction (towards the right or towards the left, etc.) to move with the console (typically by turning on himself) so that the directional antenna suitably points towards the drone, and/or to warn him about a situation in which the position of the drone is such that the wireless link is liable to be of bad quality, or even lost.

To solve this problem, the invention proposes a system for piloting a drone in immersion, comprising, in a manner known in itself from the above-mentioned WO 99/05580 A2, a drone provided with imaging means and a ground station communicating with the drone through a wireless link. The ground station comprises a console provided with a directional antenna adapted to be directed towards the drone to maintain the quality of the wireless link, and virtual reality glasses rendering images taken by means of the imaging means and transmitted from the drone through the wireless link, as well as visual indications included in the rendered images. Characteristically of the invention, the system further includes means for determining a defined angular coordinate between a heading direction of the console and a direction of the drone, and means sensitive to these determination means, to include in said visual indications an indication of misalignment of the drone with respect to the console heading, this indication of misalignment being function of said determined angular coordinate, so as to allow a user of the console to perform a corrective action of reorientation of the console towards a reduction of said angular coordinate).

The system also optionally comprises the advantageous following characteristics, taken individually or according to any combination that the one skilled in the art will recognize as technically compatible:

the position determination means comprise a magnetometer to determine the console heading;

the position determination means comprise GPS positioning modules provided in the drone and in the ground station, and processing means for determining an orientation of the drone, corresponding to a line passing through the drone and the console, with respect to a direction of the North;

the means for determining said angular coordinate comprise a means for subtracting the heading angle of the console and the corresponding angle of said drone orientation;

the position determining means comprise a means for comparing the angular position of the drone relative to a heading of the console with an angular template corresponding to an angular sector, centred on said heading, outside of which said wireless link is liable to be of bad quality, or lost;

in this latter case, if the wireless link is adapted to operate in one of at least two modes corresponding to different directivities of the antenna, means for selecting an angular template of good reception as a function of the active mode of wireless link are also provided;

the system further comprises means sensitive to the level of the signal of the wireless link received from the drone to selectively include or not said visual indication;

in this latter case, said visual indication is advantageously included in the case where the angular position of the drone is comprised in the angular template but the level of the signal is lower than a predetermined threshold, and is not included in the case where the angular position of the drone is not comprised in the angular template but the level of the signal is higher than a predetermined threshold;

said visual indication comprises a visual signalling of the relative position of the console and of the drone, with a sector of a circle representative of an angular template of good reception, and a pictogram whose position is representative of the angular position of the drone with respect to the template;

in this latter case, said visual indication advantageously comprises a set of directional arrows able to be each selectively displayed to indicate a desired direction of displacement for the console so as to bring the console heading towards the direction of the drone, said directional arrows comprising arrows towards the left and towards the right and/or towards the top and towards the bottom.

An exemplary embodiment of a system for image transmission between a drone and a ground station according to the invention will now be described, with reference to the appended drawings in which the same references denote identical or functionally similar elements throughout the figures.

FIG. 1 schematically illustrates a drone and ground station unit of the market, to which the invention is advantageously applied.

An exemplary embodiment of the device of the invention will now be described.

A immersion imaging (First-Person View) system according to the present invention comprises a drone equipped with at least one imaging camera, a ground station communicating through a wireless link of suitable range with the drone and virtual reality glasses, provided with means for rendering in front of the user's eyes images giving him the feeling to fly on board the drone, in the most realistic way possible (flight said in First Person View or FPV mode).

In this example, the drone comprises a single camera with a fisheye-type lens, but could as a variant include a set of cameras, and digital processing means located on board and/or provided in the ground station, making it possible to combine the images of the various cameras.

Figure 1:
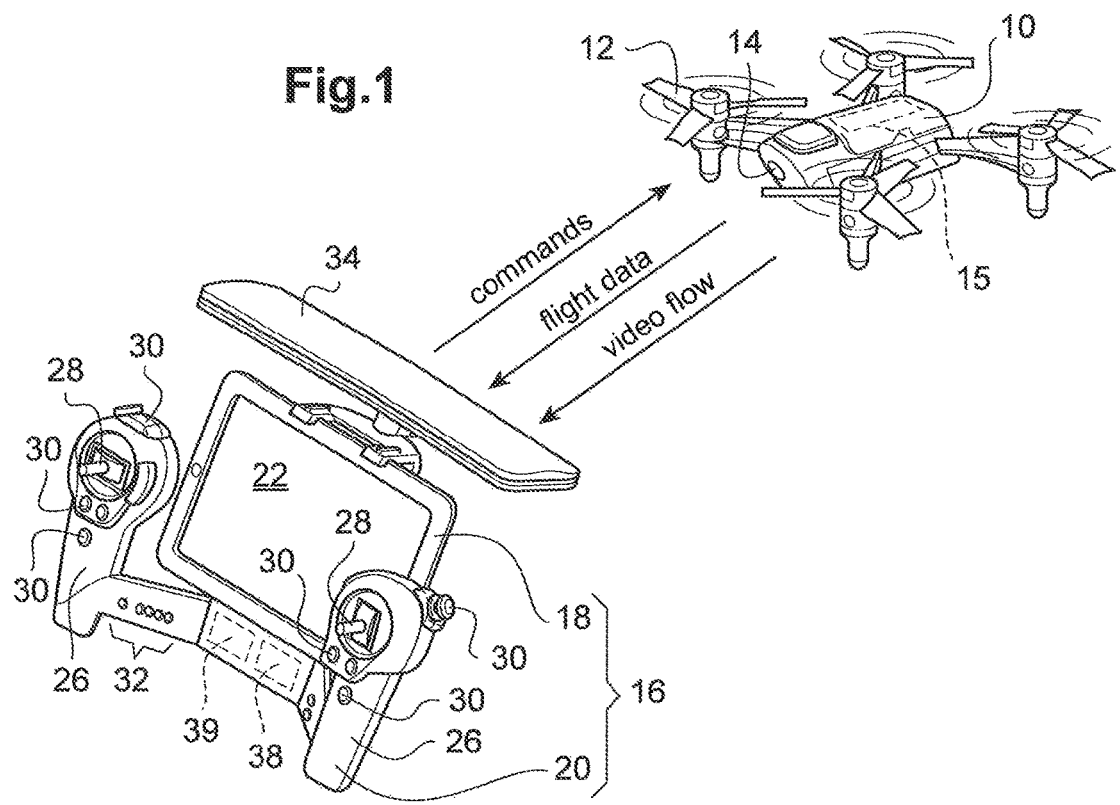

In FIG. 1, the reference 10 generally denotes the drone, for example a flying drone of the quadricopter type, such as the Bebop model of Parrot S A, Paris, France. This drone includes four coplanar rotors 12, whose motors are piloted independently by an integrated navigation and attitude control system. The drone also includes a front-view camera 14 making it possible to obtain a video image of the scene towards which is directed the drone, for example a high-definition camera with a CMOS sensor of resolution 1920× 1080 pixels with a refresh frequency of the video flow of 30 fps (frame per second), associated with a wide-angle lens of the fish-eye type.

The drone has also image processing and correcting means adapted to frame in real time or almost real time the images taken by the drone as a function of a direction to which the user wishes to look at, as will be seen hereinafter.

The drone 10 also comprises a GPS module 15 (not visible) adapted to process and deliver to the ground station, systematically or on command, its GPS coordinates taken at regular intervals.

The drone is piloted by a ground station 16 comprising a remote-control console 20 associated with a tablet 18.

The tablet 18 is a conventional tablet, for example of the iPad type (registered trademark) or the like, comprising a visualization screen 22, and in which has been loaded an applicative software module for piloting the drone 10 and for visualizing the images taken by the on-board camera 14. The tablet 18 is moreover equipped with a data exchange radio interface, for example of the Wi-Fi type. It is a tablet of a standard model, not modified except the loading of the applicative software module.

The screen 22 of the tablet 18 displays the image of the scene captured by the on-board camera 14 of the drone with, in superimposition, a certain number of symbols allowing the control of various navigation parameters. This screen is a touch screen allowing the activation of piloting commands by simple contact of an operator's finger on the symbols displayed on the screen (up/down displacements, attitude control, etc.). Those actions are interpreted by the applicative software that transforms them into command signals intended to the drone, sent on the data exchange Wi-Fi interface. Conversely, the flight data coming from the drone 10, received by the Wi-Fi interface, are delivered to the applicative software to be processed therein and possibly be displayed on the screen 22 of the tablet.

The production of commands from the touch screen of the tablet is herein only optional, the different commands being duplicated and complemented by actions on various buttons and levers of the console 20.

More precisely, the console 20 includes a support 24 making it possible to fasten the tablet 18 to the console, in front of the operator so that the latter can see the totality of the surface of the screen 22. The body of the console 20 is extended on each side by handles 26 provided with various control members such as levers 28 of the "joystick" type and buttons 30 arranged within reach of the operator's fingers and each associated with a particular command (take-off/ landing, return to start point, triggering of the recording of the scene captured by the camera, etc.). The console 20 is also provided with various luminous indicators 32 (level of the drone battery, recording in progress, strength of the wireless signal received from the drone, etc.), as well as connection arrangements (not shown) allowing the plugging of accessories, among which virtual reality glasses with an integrated screen, usable as an alternative to the visual display screen 22 of the tablet. As a variant, the accessories can communicate with the console through a wireless communication.

The console 20 is also provided with a long-range directional Wi-Fi antenna 34 that the operator directs towards the drone 10 when he has the remote-control console 20 in hands. This Wi-Fi link conveys in particular towards the drone the piloting controls intended to the drone 10, the angular components data of the direction in which the user in immersion wishes to look at the scene taken by the camera 14 (as will be described hereinafter), and from the drone the video signal coming from the camera, herein framed in the drone by the above-mentioned processing means. In a preferred embodiment, the wireless link is liable to operate in two frequency bands, for example 2.4 and 5.2 GHz, with different characteristics of transmission and directivity.

The console 20 is also equipped with a magnetometer, preferably a 3-axis magnetometer, making it possible to determine the heading thereof with respect to the magnetic North. Advantageously, this magnetometer belongs to an inertial unit 38, preferably comprising a 3-axis accelerometer, a 3-axis gyrometer and the above-mentioned magnetometer.

Figure 2:
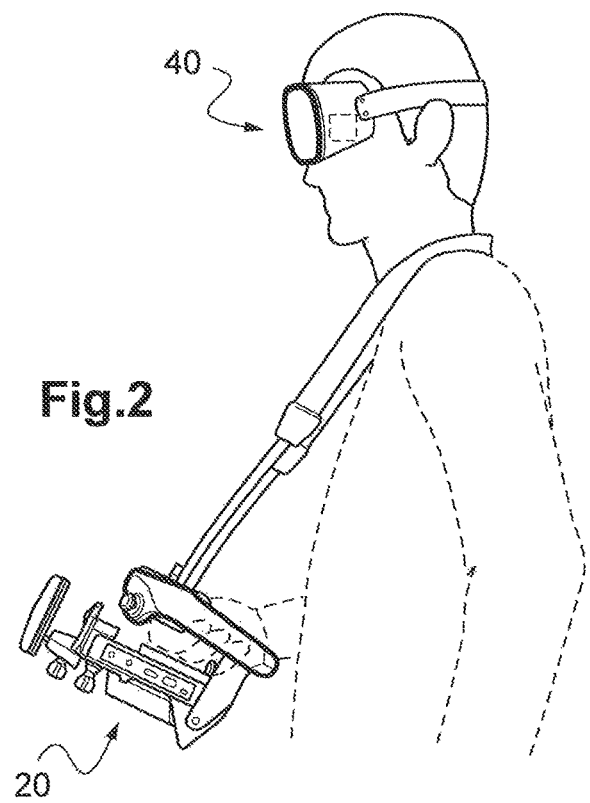
FIG. 2 illustrates the ground station of FIG. 1, completed by immersive-mode piloting glasses.

The console further includes a GPS module 39 able to deliver its own GPS coordinates, in particular for purposes such as explained hereinafter. With reference to FIG. 2, the console 20 is shown, with virtual reality glasses 40 connected to the console through a wire or a wireless link, as described hereinabove, constituting a bidirectional communication channel.

For example, the glasses are of the Oculus Rift (Registered Trademark) type, marketed by the Oculus Company, Menlo Park, Calif., USA, connected to the console 20 through a HDMI and/or USB link, or glasses of the Zeiss VR One (Registered Trademark) type, these latter incorporating a portable phone replacing the tablet 18 and the link with the console 20 being then a wireless link.

The console 20 is adapted to communicate in an uplink direction with the glasses 40 so that the latter display a video image. In the simplest embodiment, this image is a copy of the image displayed on the visualization screen 22 of the tablet.

The general principle of the invention consists in signalling to the pilot, in any known manner but preferably at the display screen of the glasses, an indication of the good alignment or the bad alignment of the console, and hence of its directional antenna, with respect to the drone.

Figure 3:
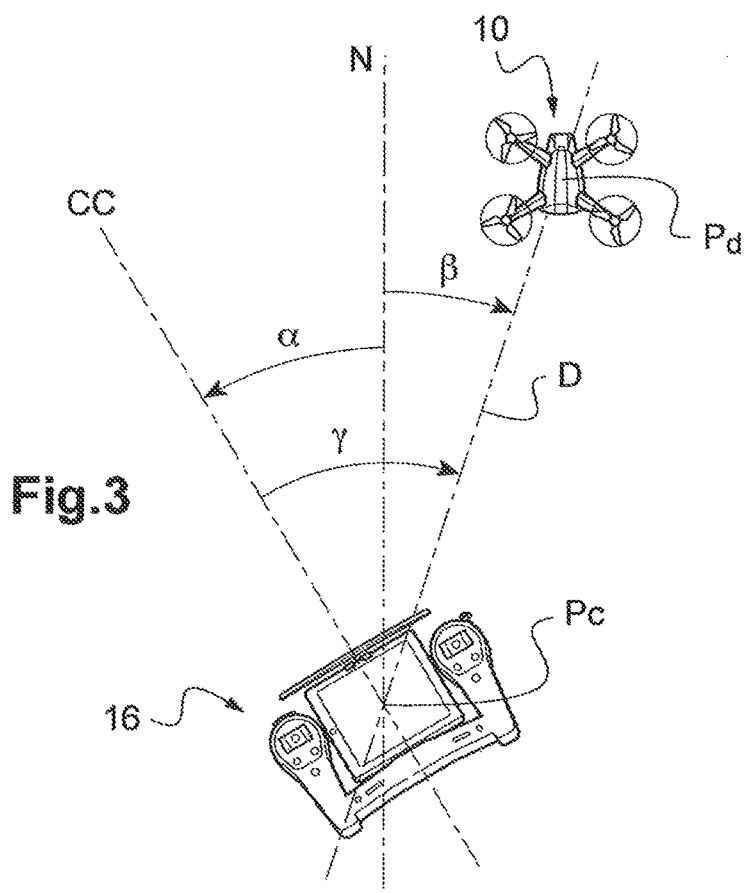
FIG. 3 illustrates in top view geometric characteristics reflecting the mutual position of a console of the ground station and of the drone.

With reference to FIG. 3, the drone 10 and the ground station 16 consisted of the console 20 provided with the tablet 18 are illustrated. In this figure, for the sake of simplification, it is considered as a first approximation that the magnetic North (the reference for the magnetometers) and the geographic North (that of the GPS coordinates) are merged, the North being indicated by N.

The line CC denotes the heading of the console 20, and the angle α denotes the angle formed by the console heading with respect to the North (positive value in the trigonometric direction). The word "heading" will be understood in its current meaning, in particular in the field of navigation, i.e. the front direction, towards which a mobile is orientated (or points). The heading may be quantified by the angle between the main axis of this mobile and the direction of the North (geographic or magnetic). In the present case, the heading is the direction towards which the console 20 points, direction which is located in the median plane (plane of symmetry) of the console and which also corresponds to the direction of the main lobe of the radiation diagram of the directional antenna 34.

The line D denotes the direction of the drone, i.e. the line that connects the centre of the reference system of the drone 10 (position Pd) and the centre of the reference system of the console 20 (position Pc). The GPS coordinates of the drone and of the console make it possible to determine this line, and hence the angle β of this line D with respect to the North N (value that is herein negative in the trigonometric direction).

It is hence understood that the angular coordinate of the drone 10 with respect to the console 20 is equal to the difference between the algebraic values of these two angles, i.e. γ=β−α (herein, an absolute value α+β, taking into account the opposite signs). The value of this angle γ makes it possible, as will be seen, to signal to the pilot the situations in which the drone excessively angularly moves away from the console heading CC, to allow him to perform the corrective action (reorientation of the console) that must be done.

Figure 4:
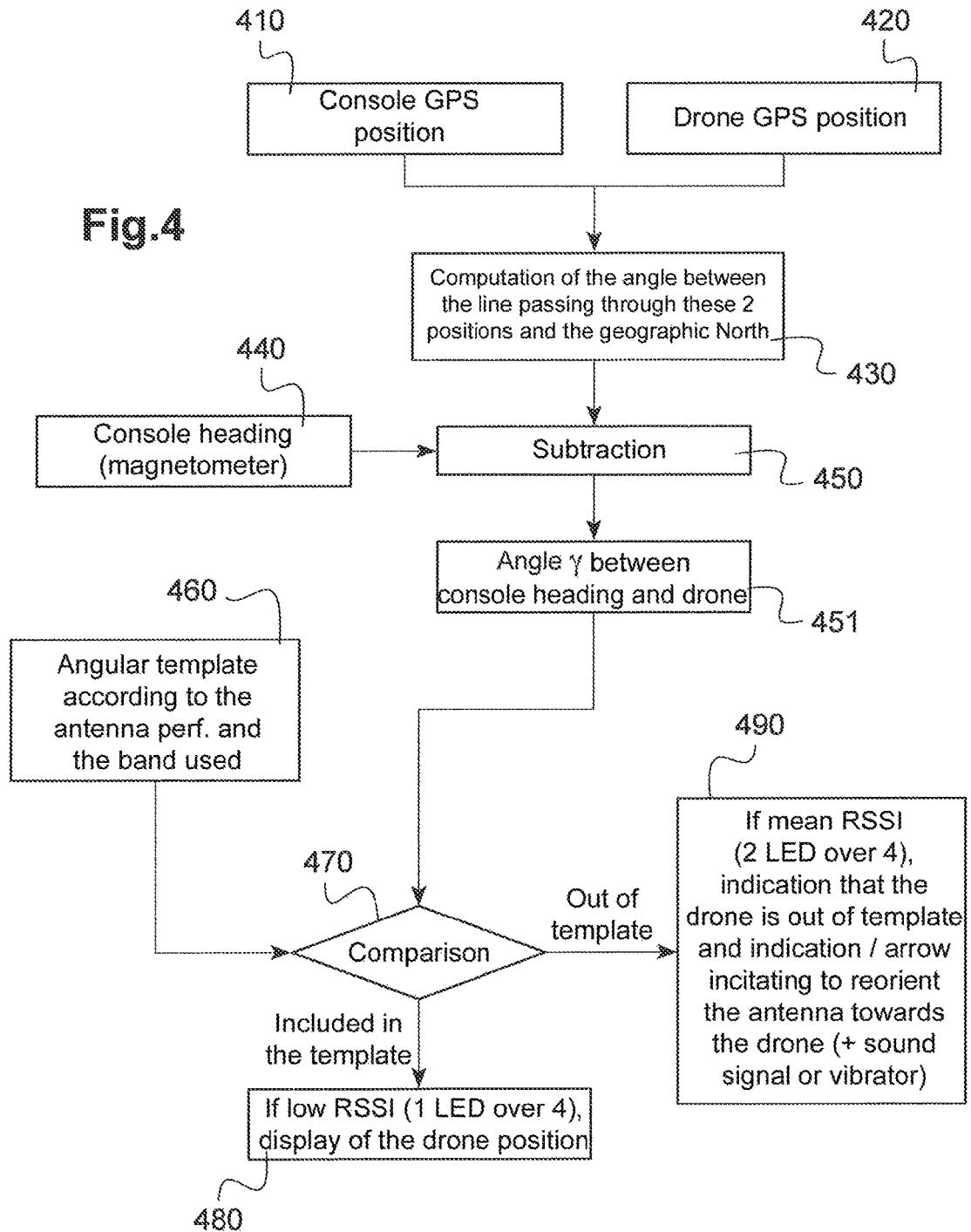
FIG. 4 is a logigram of the essential functions performed by the system of the invention.

With reference now to FIG. 4, a processing process making it possible to implement this functionality will be described in detail.

At step 410, the GPS module 39 of the console 20 generates the GPS coordinates of the latter. At step 420, the GPS module 15 of the drone generates the GPS coordinates of the latter and sends them to the console via the wireless link. At step 430, the processing means of the ground station 16 (located either in the console 20, or in the tablet 18) compute the angle β formed between the line D passing through the drone and the console with respect to the North (herein the geographic North).

At step 440, the magnetometer 38 of the console determines the angle α between the console heading CC and the North (herein the magnetic North).

At step 450, these two angle values (oriented values) are subtracted from each other, to generate the angular coordinate γ of the drone 10 with respect to the console heading CC (step 451). Advantageously, the management of the offset between the geographic North and the magnetic North (magnetic declination) is integrated in this operation.

In the case where the wireless link between the console 20 and the drone 10 implements frequency bands or more generally technologies that make so that the directivity of the antenna is different from one mode to another, then step 460 determines, as a function of the currently active link mode, an angular template making it possible to make the distinction between a situation in which the drone is suitably placed with respect to the console heading CC, and a situation in which the position of the drone is such that the wireless link is liable to be of bad quality, or even lost.

For example, in the case of a Wi-Fi link in the band of 2.4 GHz, the drone is considered as being well positioned if it is in the angular sector of ±80° with respect to the console heading (sector called template). And in the case of a Wi-Fi link in the band of 5.2 GHz, this angular sector is then only of ±30°. In the case of a low received signal—corresponding for example to only two indicative LED lighted-up (1 red and 1 white)—, the angle of opening of this template may be restricted, for example to ±40° or ±15° according to the band used.

At step 470, the processing means compare the value of γ generated at step 450 with the template to be used for the active wireless link.

In the case where this value is included in the template, the following step 480 determines the strength (level) of the signal received from the drone 10, noted RSSI, and compares it with a threshold. If the strength of the signal is lower than this threshold, it means for example that the distance between the drone and the console is significant enough, and that it is hence necessary that the drone is located not only in the template, but the nearest possible to the console heading CC. In this case, the visual signaling of the mutual position of the console and of the drone, as will be described hereinafter, must be activated, whereas, in the opposite case, no visual signaling is triggered.

In the case where the step 470 shows that the angular position γ of the drone with respect to the console heading CC is outside the template, then the process passes to step 490. In this step, the RSSI strength of the wireless link signal received from the drone is also compared with a threshold. Preferably, this threshold is higher than the threshold used for step 480. In the case where the signal is higher than the threshold, no visual signalling is triggered. In practice, it will mean most of time that the misalignment of the drone 10 with respect to the console 20 is significant, but that the drone is near enough to the console so that the quality of the wireless link between the drone and the console remains satisfying. On the contrary, in the case where the strength of the signal is lower than the threshold, then a visual signalling (detailed hereinafter) is triggered. This signalling includes in this case, in addition to an indication of the position of the drone with respect to the console heading, indications intended to facilitate the putting back of the console in alignment with the drone by causing the pilot to turn on himself in a certain direction, as will be explained hereinafter.

The triggering of a visual signalling may be accompanied with a sound signalling, a vibration, etc. so as to attract the attention of the pilot about the necessity to rapidly correct the alignment of the console with respect to the position of the drone.

Figure 5:
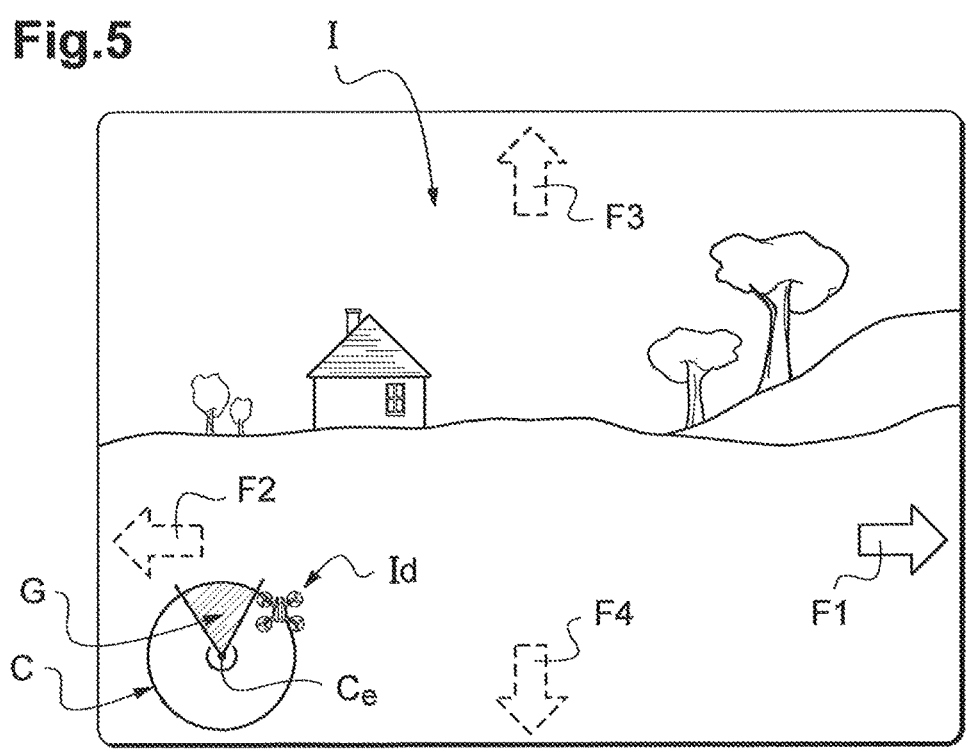
FIG. 5 shows an example of visual indication superimposed with the images rendered by the glasses.

With reference to FIG. 5, examples of visual indications implementable in the present invention will now be described. This figure shows an image I taken by the camera 14 on-board the drone 10 and rendered in the virtual reality glasses 40.

The visual signalling of an "out-of-template" situation of the drone comprises in all the cases a circle C having a centre Ce that represents for the pilot his own position in the space of navigation. The angular position (angle γ) of the drone 10 with respect to the console heading CC is shown by means of an icon or a pictogram of the drone, referred Id, placed at the corresponding place of the circle C. Advantageously, this signalling also comprises a representation of the currently active template, in the case where several templates corresponding to several modes of wireless communication are managed by the system. This representation is herein in the form of a circular sector G whose angular extend is identical to that of the template.

In an embodiment, the sector can be coloured, with a colour that may vary as a function of the emergency of the required correction, which may itself be reflected by the strength of the wireless communication signal received from the drone 10.

In the representation of FIG. 5, the drone is located at about 45° towards the right with respect to the drone heading, which corresponds to the bisecting line of the template G, and the template G has a width of ±30°.

Moreover, in the case where the drone 10 is located out of the template with an insufficient level of signal, as detailed hereinabove with reference to step 490, then an additional visual signalling is implemented, for example as a directional arrow located along a corresponding edge of the screen. In the example illustrated, for which it is necessary in case of insufficient signal to make the console turn to the right (in the clockwise direction in FIG. 3), it is an arrow F1 directed towards the right and located along the right edge of the screen. This arrow, which indicates to the pilot to turn in one direction or the other, also permit to indicate to him the minimum of displacement/rotation to orient himself towards the drone.

Other arrows F2, F3, F4 may be selectively displayed as a function of the misalignment of the drone with respect to the console.

It will be observed herein that, according to the pattern of directivity of the console antenna 34, it is possible to generate only the yaw misalignment (by rotation of the console about a vertical axis), or both yaw and pitch misalignments (by rotation not only about a vertical axis but also about a horizontal axis perpendicular to the console heading CC). In the first case, only the lateral arrows F1 and F2 will be able to be one or the other displayed. In the second case, it will be one of the arrows F1, F2, F3, F3 that will be displayed.

It will be noted for that purpose that the management of the pitch misalignments is easily implemented thanks to the fact that the altitude is taken into account by the GPS coordinate system, and thanks to the fact that the reference in this case, i.e. the horizontal, is obtained either by means of the magnetometer integrated to the console, or by means of the gyroscope also integrated to the latter.

Of course, the present invention is not in any way limited to the embodiments described and shown, and the one skilled in the art will be able to bring many variants and modifications thereto. In particular:

it applies to drones of various types: for inspection, leisure or other purposes, hovering or not, and to any type of virtual reality glasses;

the processing operations for detecting the position of the drone with respect to the console and for generating displays in the rendered image may be distributed in any desired manner between the console 20, the tablet 18 and the virtual reality glasses 40 in the case where these latter include processing means, in particular a graphic processor;

the virtual reality glasses may include a dedicated display system, or a smart terminal of the market such as a smartphone or a tablet, added on the glasses.

The invention claimed is:

1. A system for piloting a drone in immersion, comprising the drone provided with an imaging means and a ground station communicating with the drone through a radio wireless link, the ground station comprising:

a console orientated along a heading direction towards which the console points, the console being provided with a directional antenna adapted to be directed, by a user handling the console, towards the drone to maintain the quality of the wireless link;

a determination means for determining a direction of the drone;

virtual reality glasses rendering images taken by means of the imaging means and transmitted from the drone by the wireless link, as well as visual indications included in the rendered images; and an indicating means for including among the visual indications an indication based on the direction of the drone;

wherein the determination means include
  a means for determining an angular coordinate (γ) defined between the heading direction of the console and the direction of the drone;
  wherein the indicating means is a means sensitive to the determination means;
  wherein the indication based on the direction of the drone is an indication of a misalignment of the direction of the drone with respect to the heading direction of the console,
and wherein the indication is a function of the determined angular coordinate (γ), whereby allowing the user handling the console to perform a corrective action of reorientation of the console towards a reduction of the angular coordinate (γ).

2. The system of claim 1, wherein the position determination means comprise a magnetometer to determine the console heading.

3. The system of claim 2, wherein the means for determining the angular coordinate (γ) comprise a means for subtracting the heading angle (α) of the console heading and the corresponding angle (β) of the drone orientation.

4. The system of claim 1, wherein the position determination means comprise GPS positioning modules provided in the drone and in the ground station, and processing means for determining an orientation of the drone, corresponding to a line passing through the drone and the console, with respect to a direction of the North (N).

5. The system of claim 4, wherein the means for determining the angular coordinate (γ) comprise a means for subtracting the heading angle (α) of the console heading and the corresponding angle (β) of the drone orientation.

6. The system of claim 1, wherein the position determining means comprise a means for comparing an angular position of the drone relative to a heading of the console with an angular template corresponding to an angular sector, centred on the heading, outside of which the wireless link is liable to be of bad quality, or lost.

7. The system of claim 6, wherein the wireless link is adapted to operate in one of at least two modes corresponding to different directivities of the antenna, and also comprising means for selecting the angular template of good reception as a function of an active mode of the wireless link.

8. The system of claim 6, further comprising means sensitive to the level of the wireless link signal received from the drone to selectively include or not the visual indication.

9. The system of claim 8, wherein the visual indication is included in the case where the angular position of the drone is comprised in the angular template but the level of the signal is lower than a predetermined threshold, and is not included in the case where the angular position of the drone is not comprised in the angular template but the level of the signal is higher than a predetermined threshold.

10. The system of claim 1, wherein the visual indication comprises a visual signalling of the relative position of the console and of the drone, with a sector of a circle representative of an angular template of good reception, and a pictogram whose position is representative of an angular position of the drone with respect to the template.

11. The system of claim 1, wherein the visual indication also comprises a set of directional arrows able to be each selectively displayed to indicate a desired direction of displacement for the console so as to bring the console heading towards the direction of the drone, the directional arrows comprising arrows towards the left and towards the right and/or towards the top and towards the bottom.

* * * * *